April 21, 1931.  A. R. BURNETTE  1,801,263
METHOD OF HEATING FOR DRYING, BAKING, DISTILLING, AND THE LIKE
Filed March 30, 1929  2 Sheets-Sheet 2
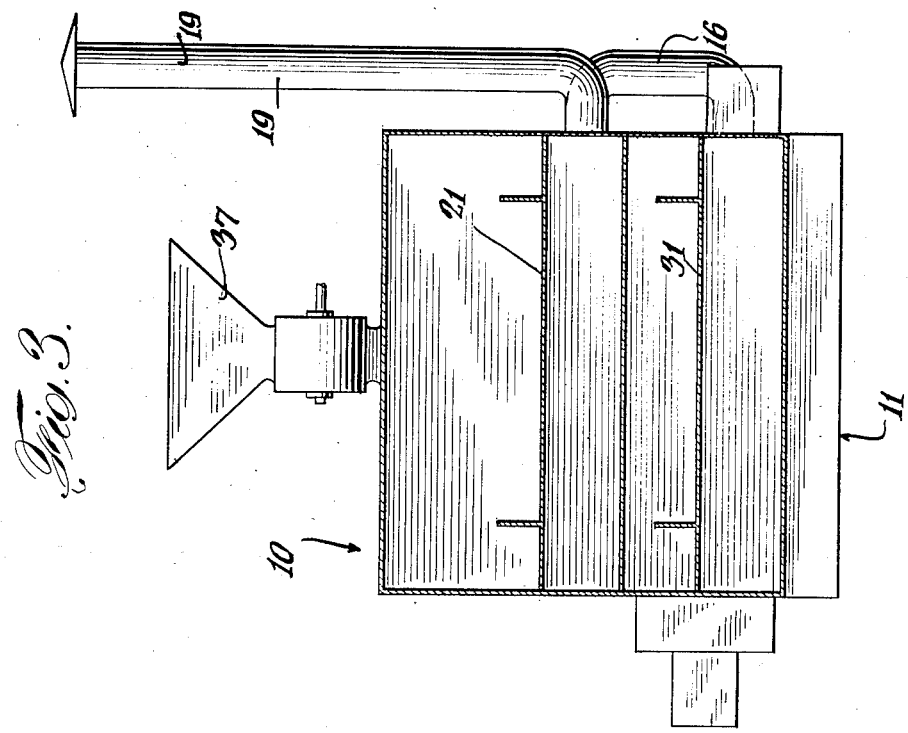
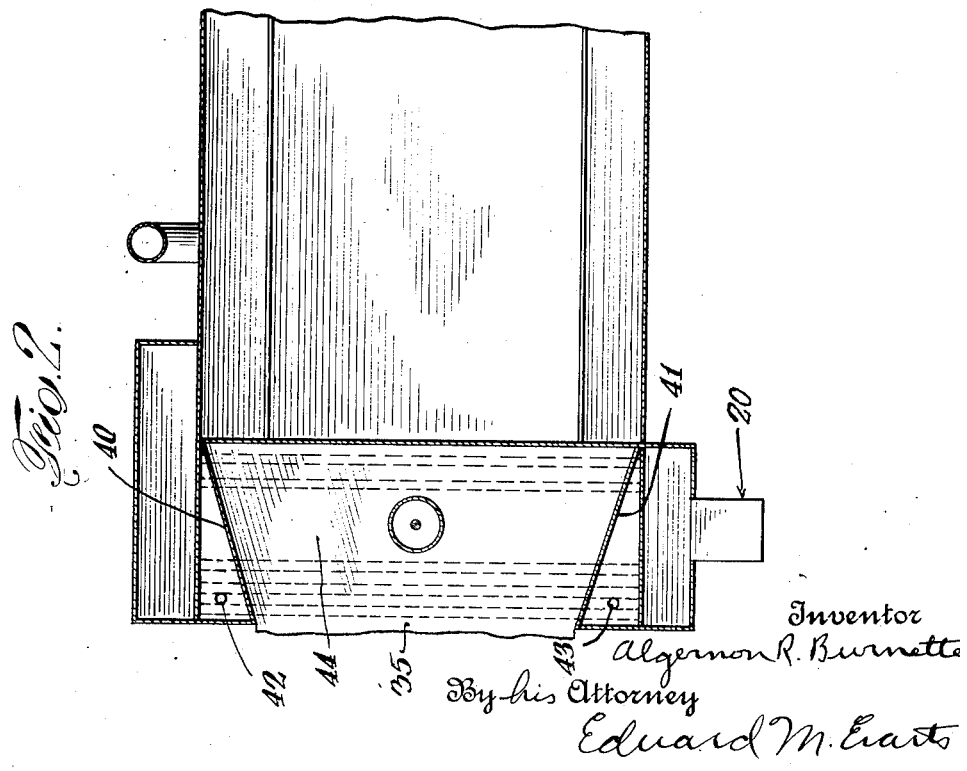
Inventor
Algernon R. Burnette
By his Attorney
Edward M. Evarts Patented Apr. 21, 1931

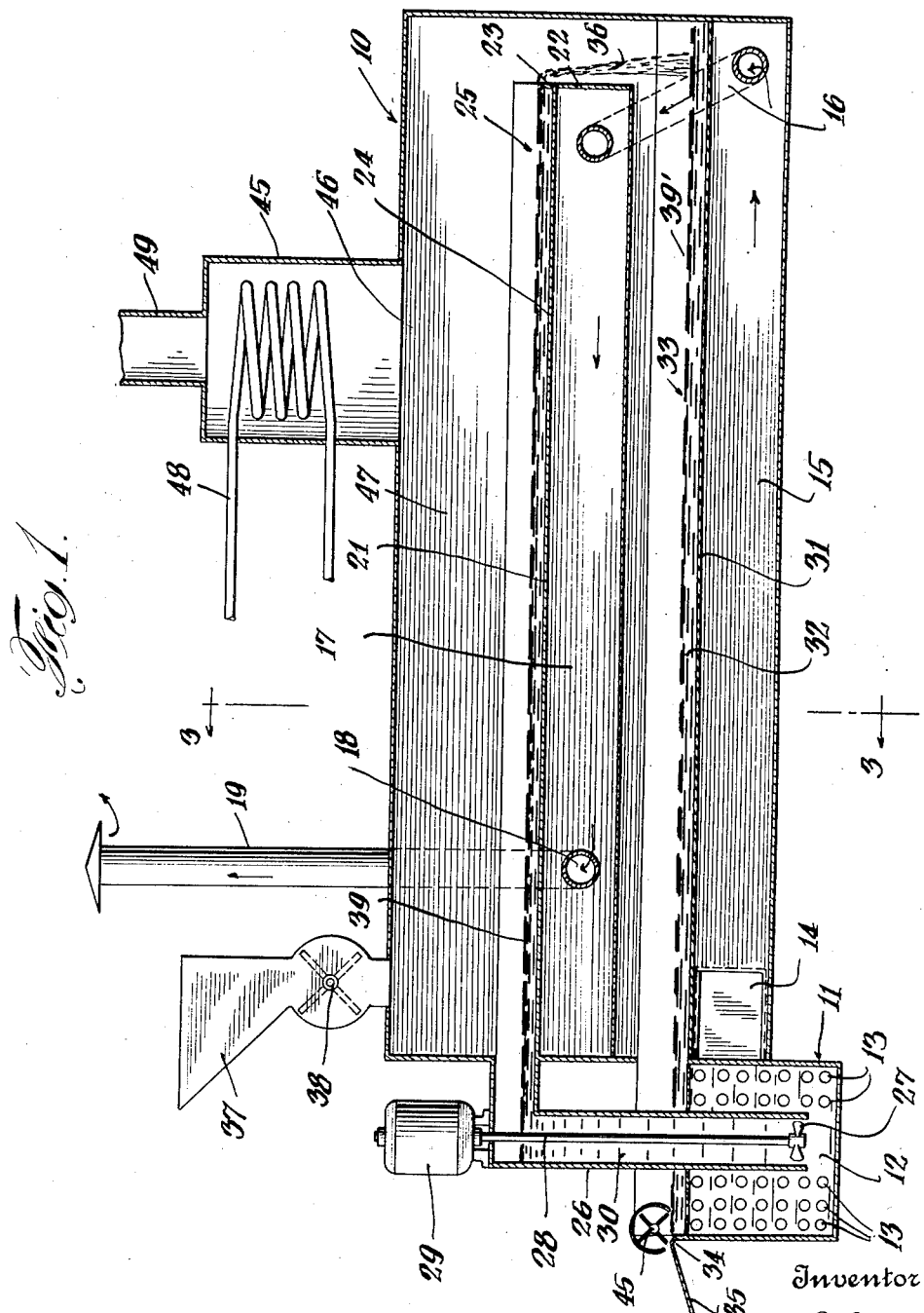

1,801,263

UNITED STATES PATENT OFFICE

ALGERNON R. BURNETTE, OF EAST ORANGE, NEW JERSEY

METHOD OF HEATING FOR DRYING, BAKING, DISTILLING, AND THE LIKE

Application filed March 30, 1929. Serial No. 351,349.

My present invention relates to methods of heating and otherwise treating liquid, plastic and solid materials, preferably in a substantially continuous manner, and aims to devise methods of the general character specified which are simple to practise, which may be practised in a substantially continuous manner, which require relatively simple apparatus for their practise, and which permit the desired heating and other treatments to be effected efficiently, economically and with maximum ease, the methods of the present invention being further characterized by the ease with which the material to be treated, whether liquid, plastic or solid, may be entered for treatment, the efficiency with which it is treated, and the ease with which it may be removed after it has been treated, the methods of the present invention further lending themselves to substantially continuous treatment if so desired. Other objects and advantages of the methods of the present invention, particularly as exemplified in the following illustrative embodiments of the same, will in part be pointed out in detail hereinafter and will in part be obvious to those skilled in the art to which the present invention relates.

In the accompanying specification I shall describe, and in the annexed drawings more or less diagrammatically exemplify, several illustrative embodiments of the methods of the present invention. It is, however, to be clearly understood that my invention is not limited to the specific embodiments thereof herein described and more or less diagrammatically exemplified for purposes of illustration only. In the accompanying specification I shall also describe and in the annexed drawing more or less diagrammatically exemplify one form of apparatus which may be conveniently and successfully employed in the practise of the aforesaid illustrative embodiments of the methods of the present invention, or any of them. It is, however, to be clearly understood that such illustrative embodiments of the methods of the present invention are not restricted to their practise by means of the aforesaid il50 lustrative form of apparatus or any other particular form of apparatus, nor is such illustrative form of the apparatus restricted in its use to the practise of the aforesaid illustrative embodiments of the methods of the present invention, or any of them, such form of the apparatus not constituting a necessary part of the present invention but being fully described and being fully claimed in a copending application of mine filed of even date herewith and entitled "Means for heating for drying, baking, distilling and the like".

Referring to the drawing, in which I have illustrated the aforesaid form of apparatus and in which I have also more or less diagrammatically exemplified the aforesaid illustrative embodiments of the methods of the present invention:

Fig. 1 is a longitudinal sectional view of such apparatus;

Fig. 2 is a fragmentary plan view of the same adjacent the outlet or removal end of the same; and Fig. 3 is a cross sectional view of the same taken along line 3—3 of Fig. 1 of the drawing.

Before describing the aforesaid illustrative embodiments of the methods of the present invention, it may be desirable briefly to describe the shortcomings and deficiencies of the prior art to which the present invention relates. Hitherto in connection, for example, with the cracking or similar treatments of oils and the like, it has been customary to use a retort or furnace in which the cracking or similar treatment is conducted by the batch method. By this method the interior of the retort or furnace becomes lined with coke which greatly diminishes the thermal efficiency of the process and which also adheres to the interior of the retort or furnace lining and must be removed by some process such as chiseling or the like before the furnace or retort may be efficiently used again.

In connection with drying and heat distillation processes, such processes are often also conducted by the batch method and in any event, as hitherto conducted in accordance with the prior art, have been relatively inefficient due to the poor thermal contact between the heating medium and the material being heated whether for drying, distilling or the like.

In many chemical processes where heat is one of the agencies for effecting the desired reaction, the processes are conducted by the batch method or if conducted in a continuous manner, there has been a great loss of heat values due to the inefficient method of transferring the heat from the heating medium to the materials, whether in fluid, plastic or solid form, which are to be heated for the purpose of the desired reaction. Furthermore, and this applies particularly to a substance in a fluid or plastic condition, it has been difficult to handle such materials with respect to the heating medium, a difficulty which often exists also in connection with the treatment of solid materials, whether in coarse granular, fine granular of pulverulent form.

These difficulties are to a great extent overcome and numerous advantages rendered possible by means of the methods of the present invention as exemplified in the aforesaid illustrative embodiments of the same, certain of which embodiments will now be described in detail. A wide variety of materials may be treated by means of the methods of the present invention. For example, hydrocarbon oils and the like may be subjected to cracking and other treatments, this being one example of a liquid or fluid substance which may be successfully treated in accordance with the principles of the methods of the present invention. Moreover a wide variety of plastic substances, such as the so-called "synthetic resins" or "condensation products" may be successfully treated in accordance with the heating principles of the methods of the present invention where such heating is desired. Finally, a wide variety of solid substances, whether in coarse granular, fine granular or pulverulent condition, may be heat treated in accordance with the principles of the methods of the present invention. It may here also be stated that a wide variety of chemical reactions resulting in the conversion of substances from one phase to another, as from the solid to the liquid phase, or from the liquid to the plastic or solid phase, may be successfully carried out in accordance with the principles of the methods of the present invention and the treated materials efficiently and conveniently recovered. Among the operations to which solid materials, for example, may be succcessfully subjected in accordance with the principles of the methods of the present invention are drying, destructive distillation, as of wood, chemical reactions for converting solid material in one condition to such material in another condition, and the like. By way of example merely, I shall describe the process as applied to the drying of a granular material having a predetermined moisture content which it is desired to reduce in accordance with the principles of the methods of the present invention. For this purpose, the material to be dried is fed onto a bath of hot molten metal on which it floats. Any desired movement, as a simple flowing movement or a circulatory movement may be imparted to the bath of hot molten metal. Accordingly, the material floating on such bath of hot molten metal will be given the same movement. At some point or other of the flow or other movement of the bath of hot molten metal the material, when it has been subjected to the desired drying or other treatment, may be removed from the bath on which it floats. It may here also be stated that by the term "bath" I mean to include also a succession of baths on the same or different levels including an arrangement by which hot molten metal flows from one bath to the other, as in a series of cascades, the baths being at different levels or on the same level, the flowing taking place under the action of gravity or by means of a pump in a closed or open system, the metal to be returned to its starting point by any suitable circulating means.

A considerable variety of metals may be used for the metal medium of the hot molten metal bath or baths referred to. This will depend upon the temperature at which the desired heat treament or other reaction is to take place. It will depend, also, on the chemical nature of the substance being treated and on the chemical character of the hot molten metal bath itself. In general, such a molten metal medium should be used as will be neutral or inert to the material floating on the same and being subjected to the desired treatment. Where the metal, as is often the case, is oxidizable, an inert or neutral atmosphere, as of nitrogen or carbon dioxide, may be maintained above the molten metal of the bath or baths. In certain cases a reducing atmosphere, as of hydrogen or carbon monoxide, may be maintained in contact with such molten metal bath or baths.

In each such instance due consideration must be given to the melting point of the metal used for the molten metal bath and also to its boiling point, if high temperatures are desired. Among the metals which I have found particularly useful for certain classes of the desired heat treatments are lead, which melts at about 327.7 degrees C. and boils at about 1450 to about 1600 degrees C.; zinc which melts at about 419 degrees C. and boils at about 929 to about 954 degrees C.; copper which melts at about 1082 degrees C. and boils at about 2100 degrees C.; and tin which melts at about 231.9 degrees C. and boils at about 1450 to about 1600 degrees C. In certain instances I may use alloys of these metals, such as some of the lower melting bronzes and, where even lower temperatures are desired, some of the fusible alloys containing lead and antimony. In any case the metal or metal alloy to be used for the bath must be carefully selected in view of its chemical and physical properties for the particular use for which it is intended.

As already indicated, the treatment may take place in several entirely independent stages. Or it may take place in several successive but connected stages, that is, with the material passing either with or without some of the molten metal on which it floats from one stage to the next, as in a series of molten metal cascades flowing from one batch to the next either by gravity or under the forced action of suitable pumping or other circulating means.

While it is generally desirable that the atmosphere in which the molten metal baths are present shall be neutral or inert with respect to the metal or metal alloys of such metal bath or baths, it is, in fact, often desirable that such atmosphere shall have a desired chemical action on the material being treated and floating on the molten metal. In some instances the desired atmosphere may react with the metal, thus requiring the metal to be reduced to its metallic form, which can readily be done continuously with the circulation of the metal by passing the same through a desired reducing chamber or furnace. Whether the atmosphere, in which the materials being treated are present, is inert or inactive with respect to such materials, the reaction will be effected by heat and will be in the nature either of a simple drying action or of a chemical reaction brought about by such heat. Where the atmosphere is active with respect to the material being treated, any desired chemical reaction, depending upon the chemical and physical properties of such atmosphere and of the material being treated in the same, may thus be brought about.

The material to be treated may be fed through a pipe, hopper or the like, depending on its nature, onto the surface of the molten metal. The rate at which the material is fed onto such surface will determine the rate of the desired reaction, whether simple heating or otherwise. The molten metal on which the material floats is given the desired movement either under the action of gravity or under the forced circulation or other movement of a suitable pump mechanism. In the usual case, where there are several baths, metal with supernatant material floating thereon will flow in a cascade to the bath immediately below it, metal being returned to the first or uppermost bath by a suitable pumping mechanism. Any metal which may be vaporized at the temperatures employed for the treatment where the same takes place at relatively high temperatures with respect to the boiling point of the metal and the bath may be condensed by suitable cooling means and thus returned to the bath or baths from which it was vaporized.

It is ordinarily necessary also to supply heat to the metal to maintain the same in its molten condition or initially to melt the same. This heat should maintain the metal in a readily fluid condition and should supply heat lost by radiation, convection and the like. I prefer to do the heating by means of an oil burner or the like which is adjacent the principal pot in which the principal supply of molten metal is kept and from which it is circulated through the system. I prefer that the heating shall be effected by the gases of combustion in suitable furnace spaces, these gases not being brought directly into contact with the molten metal and the material being treated, which they would otherwise contaminate. The heat thus supplied melts the metal. It also keeps it molten and substantially fluid. It also heats the atmosphere surrounding the material being treated and the molten metal on which such material floats. Furthermore, the hot gases of combustion are preferably zigzagged so as most efficiently to supply their thermal values to the bath or baths of hot molten metal being circulated, the material floating on the same and the atmosphere surrounding the same.

The cycle of movement is substantially as follows: The metal in the principal source of supply is melted and maintained molten. It is circulated or otherwise moved in cascades or other fashion where a series of baths, for example, one above the other, is employed. The material to be treated, whether in liquid, plastic or solid form, is fed onto the surface of the molten metal bath at the desired point of entry. It moves along with the molten metal bath as the metal of such bath moves. Where there are a series of baths, the material moves progressively and successively from one bath to the other. During this movement the treatment will be uniformly applied to the material since it will be stirred by the movement of the molten metal on which it floats. The material approaches its exit being readily separated from the molten metal on which it floats by a weir or weirs which skim the material from the surface of the molten metal, the molten metal free from such material being returned to the principal source of supply at a point or points separate and beyond the outer sides of the weir or weirs, so that no material being treated is carried into the principal source of supply of the molten metal.

The hot gases of combustion, after melting the metal in the principal source of supply, pass under or over, or both under and over, each of the baths of molten metal and the material floating on the same, as well as the atmosphere surrounding the same. After they have delivered the desired amount of their heat values to the metal, the material floating on the same and the atmosphere surrounding the same, they are discharged through a suitable chimney or chimneys. The atmosphere surrounding the material being treated may itself be circulated, if so desired, and may be changed one or more times, depending on the particular result desired to be obtained. Any metal which has been vaporized may be condensed by a suitable cooling coil in a chamber or compartment communicating with the atmosphere surrounding the material being treated and the molten metal on which said material floats. The rate at which the material to be treated is admitted to the bath or baths of molten metal will determine the rate at which such material is treated and the rate of its removal from such bath or baths.

This completes the description of the aforesaid illustrative embodiments of the methods of the present invention. It will be noted that such methods are simple, may be easily and conveniently practised and are applicable to a wide range of heat, chemical and combined heat and chemical treatments. They are also adapted to a wide variety of materials in liquid, plastic or solid forms. Due to the fact that the material floats in intimate contact with the hot molten metal of the bath or baths, there is the utmost thermal efficiency in the conducting of the heat values of such molten metal bath or baths to the material being treated floating thereon, even when such material is itself a poor conductor of heat. Furthermore, there is always presented a fresh clean surface of metal to the material to be treated as it enters the treating process. Thus there is constantly maintained, during the entire progress of the process, the maximum thermal conductivity between the metal in the hot molten metal bath and the material floating thereon being treated. Moreover, since the material may be cleanly and completely removed, after its treatment, from the surface of the hot metal in which it floats, there will be no necessity for interrupting the progress of the process to remove coke or other solidified material which ordinarily impedes the heat treatments in accordance with the methods of the prior art and greatly reduces their thermal efficiency to such a point that the processes of the prior art have to be interrupted and the coked material removed before the process may be resumed.

In other words, while the processes of the present invention may be discontinuously practised, they are also subject to a continuous operation with undiminished thermal, chemical and physical efficiency. Just as the material may be continuously fed into the process for treatment, so it may as continuously be removed from the process after treatment. This treatment may either be a simple heat treatment for drying, or a chemical treatment by means of heat alone, as in cracking oils, or a distillation treatment for the fractionation of oils and other liquid. Or it may be a chemical treatment involving a true chemical reaction between different ingredients of the liquid, plastic or solid materials being fed onto the surface of the molten metal. Or it may be a chemical treatment in which the atmosphere in which the treatment takes place reacts chemically with the ingredient or ingredients of the material floating on the molten metal. Finally, it may be in the nature of the various heat and chemical treatments used in the manufacture of "synthetic resins" or "condensation products". In other words, a wide variety of chemical, physical, physical-chemical and other processes involving the use of heat may be efficiently and very successfully carried out by means of the methods of the present invention as above set forth. Other advantages and superiorities of the methods of the present invention, particularly as exemplified in the aforesaid illustrative embodiments of the same, will readily occur to those skilled in the art to which the present invention relates.

Referring now to the aforesaid form of apparatus by means of which the aforesaid illustrative embodiments of the methods of the present invention may be conveniently and successfully practised, 10 indicates a shell or outer structure of a furnace or the like. Such shell may be of any suitable form, for example, of general rectangular form and may be made of steel, wrought iron or brick, as desired.

11 indicates generally the combustion chamber which contains the molten metal 12 surrounding a plurality of pipes or flues 13 through which the gases of combustion may pass in heating the metal 12 surrounding such flues 13. By means of an outlet chamber 14 the hot gases of combustion pass into the lower furnace space 15 from which, by means of the flue 16, they pass into the upper combustion chamber 17 and thence, by means of the flue 18, to the chimney 19 and thus out of the furnace 10 into the air.

The heat in the combustion chamber 11 may be supplied by an oil burner 20 more clearly shown in Fig. 2 of the drawing.

Forming the upper wall of the upper furnace chamber or space 17 is a metal sheet 21. 22 indicates an end wall having an upper portion 23 which determines the level of the hot molten metal 24 of the upper molten metal bath, here generally designated by reference character 25. Metal 24 is supplied to the upper hot molten metal bath 25 through the pump chamber 26 in which operates a propeller or equivalent circulating member 27 mounted on a shaft 28 operated by a suitable electric motor 29 or other suitable means. The molten metal 12 in the space surrounding the flues 13 will rise in a column of molten metal 30 under the action of the propeller 27 and will thus be added to the metal 24 of the molten metal bath 25.

31 indicates the upper metal sheet defining the lower furnace chamber or space 15. On this is the metal 32 of the lower hot molten metal bath 33. The level of metal in this bath is determined by the upper level of the portion 34 of the discharge chute 35 at the outlet end of the apparatus. This will also determine the level of the metal 12 in the combustion pot 11 surrounding the flues 13. Metal is supplied to the molten metal bath 33 from the molten metal bath 25 by the overflow of metal from the last-mentioned bath in the form of the stream 36 more clearly illustrated in Fig. 1 of the drawing. In other words, hot molten metal will be circulated from the space surrounding the flues 13 through the chamber 26 to the upper hot molten metal bath 25 whence it cascades in the stream 36 to the lower bath of hot molten metal to be returned to the space surrounding the flues 13 in which the metal 12 is present.

Material to be treated is fed through the hopper 37 by means of the rotatable feeding member 38 onto the surface of the molten metal 24 of the upper hot molten metal bath 25. This material has been generally designated by reference character 39 and may be in the nature of granular or other material being dried or otherwise treated in accordance with the principles of the methods of the present invention as above described.

This material passes with the stream of molten metal 36 to the rear end of the lower bath 33 of hot molten metal where such material has been designated by reference character 39'. Here it floats on the metal 32 of such hot molten metal bath 33 moving with such metal just as the material 39 moved with the metal 24 of the upper hot molten metal bath 25. As it approaches the outlet end of the apparatus the material floating on the molten metal will be met by the two weirs 40 and 41 which skim the material from the surface of the metal, the metal itself passing down through the openings 42 and 43 in a pan 44 which communicates with the chute 35 for the discharge of the treated material. At 44 I have indicated rotatable discharging means which assist in the discharge of the treated material and prevent the outlet end of the apparatus from being clogged up.

I provide suitable means for condensing any vaporized metal. For this purpose I may provide a chamber 45 communicating at its lower end 46 with the atmosphere or space 47 surrounding the molten metal and supernatant material of the upper molten metal bath 25 and also surrounding the metal and supernatant material of the lower molten metal bath 33. In the chamber 45 is a cooling or condensing coil 48 which is maintained at a sufficiently low temperature to effect the condensation of the vaporized metal and thus to return the same to the upper hot molten metal bath 25 from which such metal or any desired portion of the same passes through the stream 36 to the lower hot molten metal bath 33. It may here be stated that any desired gas or gases, whether inert or active, may be passed through the hopper 37 into the space 47 and, if circulation is desired, out of the apparatus through the space 45 and the exhaust 49 communicating therewith.

This completes the description of the aforesaid illustrative form of the apparatus by means of which the aforesaid illustrative embodiments of the methods of the present invention may be conveniently and successfully practised. The manner of assembling such apparatus will, it is believed, be clear from the foregoing description. Likewise the manner of operating such apparatus will be clear from the foregoing description but may be briefly summarized as follows: Material to be treated, whether in liquid, plastic or solid form, with or without a special gas for treatment, whether inert or active, may be passed through the hopper 37. Any exhaust gas will pass out through the exhaust 49. The material 39, which may be fed at the desired rate by means of the feeding mechanism 38 onto the surface of the molten metal 24 of the upper hot molten metal bath 25, is moved along with such metal by means of the circulating means 27. The metal is kept in its desired fluid or molten condition by means of the heat supplied to the combustion chamber 11, the metal surrounding the space 13 so that the desired heating is efficiently conducted.

Molten metal, together with supernatant material, after being treated in the first bath 25, passes in the stream 36 to the second bath 33 where the material has been designated by reference character 39'. The desired heat is supplied to the metal and supernatant material, as well as to the atmosphere surrounding the two baths 25 and 33, by means of the hot gases of combustion passing through the flue 13 communicating with the combustion chamber 11 through the lower furnace space 15 from which, by means of the flue 16, they pass into the upper furnace space 17 and thence through the flue 18 to the chimney 19 and out of the furnace 10 into the air.

The rear end of the lower bath 33 at the outlet end thereof is blocked off by the two weirs 40 and 41, the lower edges of which are at the desired level with respect to the molten metal, the material floating on the same and the top of the pan 44, the outer portions of which, beyond the weirs 40 and 41, are provided with the openings 42 and 43 through which clear molten metal, free from material which had been treated, passes back into the space surrounding the flues 13 surrounding the combustion chamber 11. The material is thus easily and conveniently removed from the surface of the molten metal which is thus recirculated. Any vaporized metal is condensed by means of the condensing coils 48 and returned to the metal in the upper hot molten metal bath 25. Any heat values which may be lost by radiation or convection are restored by means of the heat supplied by the oil burner 30 or the like. Discharge of treated material is facilitated by the discharging means 45 adjacent the chute 35.

This completes the description of the aforesaid form of apparatus by means of which the aforesaid illustrative embodiments of the methods of the present invention may be conveniently and successfully practised. It will be noted that the apparatus is simple in construction and may be easily and conveniently fabricated, assembled and operated. In use it permits the efficient carrying out of the processes of the present invention, particularly as exemplified in the aforesaid illustrative embodiments of the same. It is thermally efficient and permits the aforesaid heat treatments, chemical treatments or combined heat and chemical treatments, to be carried out with maximum efficiency and, if desired, in an uninterrupted and continuous manner. Other superiorities and advantages of the aforesaid form of apparatus in construction, mode of assembly, operation and use will readily occur to those skilled in the art to which such apparatus relates.

What I claim as my invention is:

1. The method of subjecting material to heat treatments and the like, which comprises the steps of floating the same on the surface of a bath of hot molten metal, imparting movement to said bath of hot molten metal so as thus to impart movement to the material being treated floating on the surface of said bath of hot molten metal, and thereafter transferring the overflow of said first bath together with the material so treated to a second bath of hot molten metal on which said material is floated.

2. The method of subjecting material to heat treatments and the like, which comprises the steps of floating the same on the surface of a bath of hot molten metal, imparting movement to said bath of hot molten metal so as thus to impart movement to the material being treated floating on the surface of said bath of hot molten metal, transferring the overflow of said first bath together with the material so treated to a second bath of hot molten metal on which said material is floated and imparting movement to said second bath of hot molten metal so as thus to impart movement to the material floating thereon.

3. The method of subjecting material to heat treatments and the like, which comprises the steps of floating the same on the surface of a bath of hot molten metal, imparting circulatory movement to said bath of hot molten metal so as thus to impart circulatory movement to the material being treated floating on the surface of said bath of hot molten metal, and thereafter transferring the overflow of said first bath together with the material so treated to a second bath of hot molten metal on which said material is floated.

4. The method of subjecting material to heat treatments and the like, which comprises the steps of floating the same on the surface of a bath of hot molten metal, imparting circulatory movement to said bath of hot molten metal so as thus to impart circulatory movement to the material being treated floating on the surface of said bath of hot molten metal, transferring the overflow of said first bath together with the material so treated to a second bath of hot molten metal on which said material is floated and imparting movement to said second bath of hot molten metal so as thus to impart movement to the material floating thereon.

5. The method of subjecting material to heat treatments and the like, which comprises the steps of floating the same on the surface of a bath of hot molten metal, imparting movement to said bath of hot molten metal so as thus to impart movement to the material being treated floating on the surface of said bath of hot molten metal, transferring the overflow of said first bath together with the material so treated to a second bath of hot molten metal on which said material is floated and imparting circulatory movement to said second bath of hot molten metal so as thus to impart circulatory movement to the material floating thereon.

6. The method of subjecting material to heat treatments and the like, which comprises the steps of floating the same on the surface of a bath of hot molten metal, imparting circulatory movement to said bath of hot molten metal so as thus to impart circulatory movement to the material being treated floating on the surface of said bath of hot molten metal, transferring the overflow of said first bath together with the material so treated to a second bath of hot molten metal on which said material is floated and imparting circulatory movement to said second bath of hot molten metal so as thus to impart circulatory movement to the material floating thereon.

7. The method of subjecting material to heat treatments and the like, which comprises the steps of continuously feeding material to be treated on to the surface of a bath of hot molten metal, floating the same on the surface of said bath of hot molten metal, imparting movement to said bath of hot molten metal so as thus to impart movement to the material being treated floating on the surface of said bath of hot molten metal, transferring the overflow of said first bath together with the material so treated to a second bath of hot molten metal on which said material is floated and continuously removing treated material from the surface of the bath of hot molten metal on which it is floated.

8. The method of subjecting material to heat treatments and the like, which comprises the steps of continuously feeding material to be treated on to the surface of a bath of hot molten metal, floating the same on the surface of said bath of hot molten metal, imparting movement to said bath of hot molten metal so as thus to impart movement to the material being treated floating on the surface of said bath of hot molten metal, transferring the overflow of said first bath together with the material so treated to a second bath of hot molten metal on which said material is floated, imparting movement to said second bath of hot molten metal so as thus to impart movement to the material floating thereon and continuously removing treated material from the surface of the bath of hot molten metal on which it is floated.

In testimony whereof, I have signed my name to this specification this 21st day of March, 1929.

ALGERNON R. BURNETTE.